US010608266B2

(12) United States Patent
Kim

(10) Patent No.: US 10,608,266 B2
(45) Date of Patent: Mar. 31, 2020

(54) METHOD AND SYSTEM FOR CONTROLLING START OF FUEL CELL

(71) Applicant: Hyundai Motor Company, Seoul (KR)

(72) Inventor: Dae Jong Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 15/185,463

(22) Filed: Jun. 17, 2016

(65) Prior Publication Data

US 2017/0033378 A1 Feb. 2, 2017

(30) Foreign Application Priority Data

Jul. 29, 2015 (KR) ........................ 10-2015-0107039

(51) Int. Cl.
| | | |
|---|---|---|
| *H01M 8/04223* | (2016.01) | |
| *H01M 8/0432* | (2016.01) | |
| *H01M 8/04701* | (2016.01) | |
| *H01M 8/04302* | (2016.01) | |
| *H01M 8/04007* | (2016.01) | |
| *H01M 8/04537* | (2016.01) | |

(52) U.S. Cl.
CPC ..... *H01M 8/04268* (2013.01); *H01M 8/0432* (2013.01); *H01M 8/04067* (2013.01); *H01M 8/04253* (2013.01); *H01M 8/04302* (2016.02); *H01M 8/04365* (2013.01); *H01M 8/04559* (2013.01); *H01M 8/04589* (2013.01); *H01M 8/04701* (2013.01); *H01M 8/04731* (2013.01); *H01M 2250/20* (2013.01); *Y02T 90/32* (2013.01)

(58) Field of Classification Search
CPC ......... H01M 8/04223; H01M 8/04268; H01M 8/04253; H01M 8/04302; H01M 8/04007; H01M 8/04067; H01M 8/0432; H01M 8/04701
See application file for complete search history.

(56) References Cited

U.S. PATENT DOCUMENTS

2006/0246332 A1* 11/2006 Higashi ............... H01M 8/0267
429/432

FOREIGN PATENT DOCUMENTS

| JP | 2007-053051 A | 3/2007 |
|---|---|---|
| JP | 2007-073378 A | 3/2007 |
| JP | 2012-079637 A | 4/2012 |
| KR | 2011-0138443 A | 12/2011 |
| KR | 2012-0061663 A | 6/2012 |
| KR | 2013-0053237 A | 5/2013 |
| WO | 2011-148426 A1 | 12/2011 |

* cited by examiner

*Primary Examiner* — Karie O'Neill Apicella
(74) *Attorney, Agent, or Firm* — Mintz Levin Cohn Ferris Glovsky and Popeo, P.C.; Peter F. Corless

(57) ABSTRACT

A system and method of controlling a start of a fuel cell are provdied. The method includes comparing a derived internal temperature of a stack and a predetermined reference temperature value and determining whether the internal temperature of the stack is less than the reference temperature value when an ON signal of the start of the fuel cell is received. A required heat value is then derived using the internal temperature of the stack when the derived internal temperature of the stack is less than the reference temperature value. A temperature of the stack of the fuel cell is increased until a cumulative heat value caused by a temperature increase of the stack of the fuel cell is equal to the required heat value.

8 Claims, 2 Drawing Sheets

METHOD AND SYSTEM FOR CONTROLLING START OF FUEL CELL

CROSS REFERENCE TO RELATED APPLICATION

The present application claims priority of Korean Patent Application No. 10-2015-0107039 filed on Jul. 29, 2015, the entire contents of which is incorporated herein for all purposes by this reference.

BACKGROUND

Field of the Invention

The present invention relates to method and system for controlling a start of a fuel cell to control a cold start driving mode using a heat value of the fuel cell even though a coolant pump is not driven.

Description of the Related Art

In general, a fuel cell generates electricity using an electrochemical reaction of hydrogen as fuel and oxygen in the air and discharges heat and water as reaction by-products. Further, water remaining in a stack of a fuel cell may be frozen in a fuel cell vehicle including the fuel cell such as a proton exchange membrane fuel cell (PEMFC) used as a power source in an atmospheric condition below zero temperatures when the vehicle is parked over a long period of time in winter or colder weather, thus significantly reducing cold start performance.

Therefore, there is a difficulty in a next cold start due to freezing of water when the water remaining in the stack is not removed or discharged when a vehicle is turned off at low atmospheric temperatures. In other words, when the fuel cell is started while ice formed in the stack is not melted, ice hinders hydrogen and air supply paths to cause start inferiority and disturb normal operation of the fuel cell.

Therefore, various methods of controlling a cold start of the fuel cell have been proposed to prevent a flooding phenomenon. For example, one method of the related art includes supplying current only in an amount to prevent water formed in a fuel cell from being frozen and thus secure start reliability of the fuel cell during the cold start. However, in the related art, an air temperature sensor disposed at an air outlet of a stack is used to detect an internal temperature of the stack. The internal temperature of the stack may be indirectly reflected using the air temperature sensor at the air outlet when a flow rate of air is high and thus a heat capacity of air is large, but when the flow rate of air is low or severely changed, it may be difficult to indirectly reflect the internal temperature of the stack, and air may be rapidly cooled in a common distribution structure after the air is discharged from the stack, accordingly, an increase in internal temperature is not reflected.

The foregoing is intended merely to aid in the understanding of the background of the present invention, and is not intended to mean that the present invention falls within the purview of the related art that is already known to those skilled in the art.

SUMMARY

Accordingly, the present invention provides a method and a system for controlling a start of a fuel cell to appropriately control a cold start driving mode of a fuel cell vehicle using a cumulative heat value of the fuel cell even though a temperature sensor of a stack of the fuel cell is not used.

According to one aspect, a method of controlling a start of a fuel cell may include: comparing, by a controller, an internal temperature of a stack derived by a temperature sensing unit and a predetermined reference temperature value and determining whether the internal temperature of the stack is less than the reference temperature value when an ON signal of the start of the fuel cell is received; deriving, by the controller, a required heat value using the internal temperature of the stack derived by the temperature sensing unit when the derived internal temperature of the stack is less than the reference temperature value; and increasing a temperature of the stack of the fuel cell in the controller until a cumulative heat value caused by a temperature increase of the stack of the fuel cell is equal to the required heat value derived in the required heat value deriving operation. In the required heat value derivation, the internal temperature of the stack may be derived by compensating for a temperature of a coolant of the stack of the fuel cell calculated using the temperature sensing unit in the controller, based on a start off state maintaining time of the fuel cell.

The method may further include: after the required heat value derivation, deriving a momentary heat value by multiplying voltage and current values of the stack of the fuel cell in the controller; and deriving, by the controller, a cumulative heat value by integrating, based on a change in time, the derived momentary heat value from a time at which the temperature starts to be increased in the temperature increasing process. Additionally, the method may include calculating the cumulative heat value using a following equation in the controller after the required heat value derivation:

$$\text{cumulative heat value} = \int_{T1}^{T2}(V2-V1) \times I \, dt$$

wherein T1: temperature increase starting time, T2: current time, V2: theoretical voltage, V1: practical voltage, I: stack current.

The method may further include: after the temperature increasing process, limiting a vehicle output to a predetermined output limit value in the controller; changing, by the controller, the output limit value as the cumulative heat value of the stack of the fuel cell is increased; and riving a coolant pump of the stack of the fuel cell in the controller when the increased cumulative heat value of the stack of the fuel cell is a predetermined reference cumulative heat value or greater.

In the output limit change, the output limit value may be gradually increased as the cumulative heat value of the stack of the fuel cell is increased. In addition, the controller may be configured to change the output limit value when the increased cumulative heat value of the stack of the fuel cell is greater than a predetermined minimum cumulative heat value. The minimum cumulative heat value may be less than a reference cumulative heat value. In the output limit change, the output limit value may be changed to be gradually increased as the cumulative heat value of the stack of the fuel cell is increased. The method may further include finishing limiting of a vehicle output based ono the cumulative heat value in the controller after a coolant pump driving operation.

According to another aspect, a system for controlling a start of a fuel cell may include: a temperature sensing unit configured to sense or derive an internal temperature of a stack of the fuel cell; a temperature comparison unit configured to compare the derived internal temperature of the stack of the fuel cell to a predetermined reference temperature value; and a controller configured to derive a required heat value using the internal temperature of the stack when the internal temperature of the stack of the fuel cell is less than the reference temperature value, and increase a temperature of the stack of the fuel cell until a cumulative heat value caused by a temperature increase is equal to the derived required heat value.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
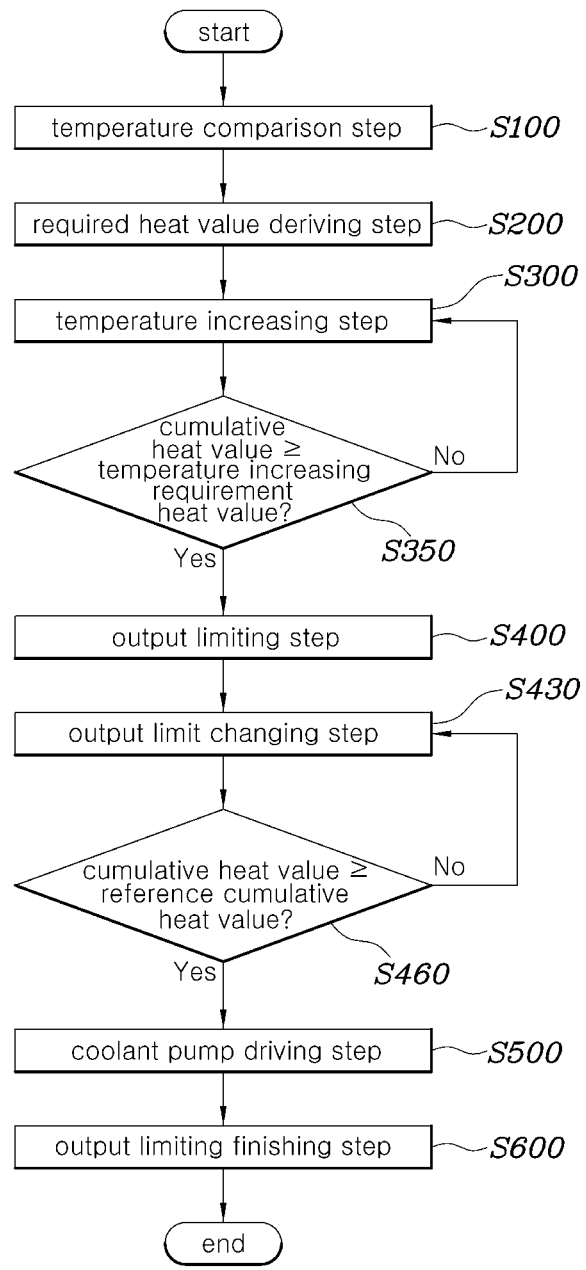
FIG. 1 is a flowchart of a method of controlling a start of a fuel cell according to an exemplary embodiment of the present invention.
Figure 2:
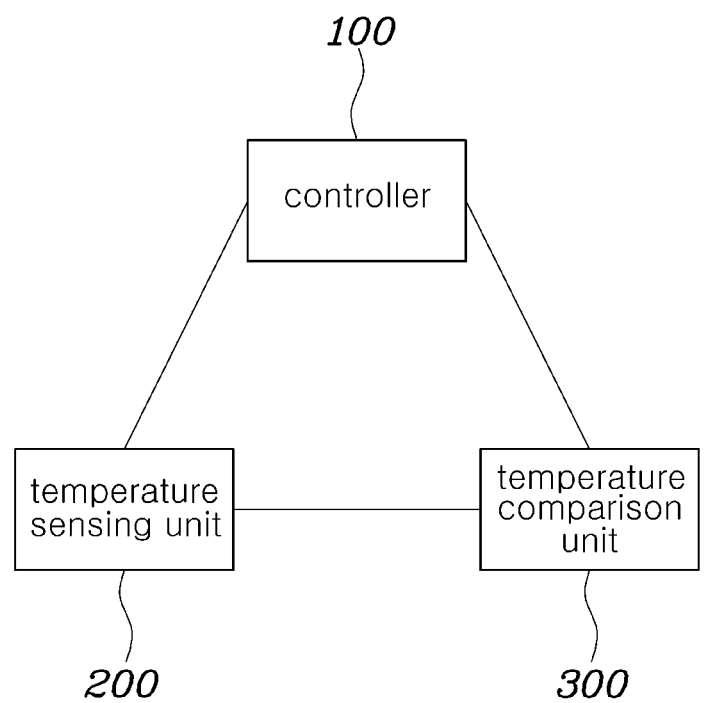
FIG. 2 is a block diagram of a system for controlling a start of a fuel cell according to the exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described with reference to the accompanying drawings. The method as described herein below may be executed by a controller 100 having a processor and a memory.

As shown in FIG. 1, a method of controlling a start of a fuel cell according to the present invention may include comparing an internal temperature of a stack derived by a temperature sensing unit (e.g., a sensor) and a predetermined reference temperature value to detect whether the internal temperature of the stack is less than the reference temperature value when an ON signal of the start of the fuel cell is received in a controller 100 (S100), deriving a heat value required for temperature increase (hereinafter, referred to as a "required heat value") using the internal temperature of the stack derived by the temperature sensing unit in the controller 100 when the derived internal temperature of the stack is less than the reference temperature value (S200), and increasing a temperature of the stack of the fuel cell until a cumulative heat value caused by a temperature increase of the stack of the fuel cell is the same as the required heat value derived at the required heat value derivation (S300).

The reference temperature value as a comparison criterion corresponds to a reference value for determining whether a start condition of the fuel cell is a cold start condition in the controller 100 at the temperature comparison S100. Therefore, a temperature at which water is frozen in the fuel cell may be the reference temperature value. Generally, since water is frozen at 0° C., the reference temperature value may be set to 0° C. However, the reference temperature value may be set based on a state and a condition of the fuel cell. The required heat value may be derived using the internal temperature of the stack derived by the temperature sensing unit at the required heat value derivation S200 performed after the temperature comparison S100.

A temperature value measured by a temperature sensor positioned in a coolant of the stack may be directly used as the internal temperature of the stack. However, the temperature of the coolant of the stack may reflect the internal temperature of the stack in real time while the fuel cell is started or immediately after a start off state of the fuel cell, accordingly, a significant error may be prevented even though the temperature of the coolant of the stack is estimated as the internal temperature of the stack. When the fuel cell is in a start off state, since the flow of the coolant is stopped, the internal temperature of the stack may not be reflected in real time. Accordingly, a temperature difference may occur due to a difference in specific heat between the inside of the stack and the coolant of the stack in process of time. Therefore, the present invention proposes a method of compensating for the difference.

The present invention proposes a method of compensating for the temperature of the coolant of the stack of the fuel cell calculated using the temperature sensing unit, based on a start off state maintaining time of the fuel cell, and deriving the internal temperature of the stack. Various methods may be provided as the compensation method. A method of performing compensation using a specific heat value of the coolant and a specific heat value of internal air of the stack in process of time may be provided, and the internal temperature of the stack may be derived using map data including the temperature of the coolant of the stack as an input value and the internal temperature of the stack as an output value.

The internal temperature of the stack may be derived using the aforementioned description and methods, and the required heat value may then be derived using the derived internal temperature of the stack. The required heat value indicates a heat value required for increasing the temperature of the stack of the fuel cell performed to improve efficiency and durability of the fuel cell in a low temperature condition. Additionally, the required heat value may be derived using various methods. A representative method may be to multiply a difference between the derived internal temperature of the stack and a target temperature of the stack and a heat capacity of internal air of the stack. Therefore, the required heat value may be increased as the initial internal temperature of the stack is reduced and the amount of air is increased in the stack.

The temperature of the stack of the fuel cell may be increased at the temperature increasing process S300 performed after the required heat value derivation S200 until the cumulative heat value caused by a temperature increase of the stack of the fuel cell is about the same as the derived required heat value. The required heat value may be derived using the aforementioned method during the present step. The cumulative heat value indicates a cumulative value of the heat values obtained when the temperature of the stack of the fuel cell is increased. Similar to the required heat value, the cumulative heat value may be derived using various methods, and the present invention proposes a method of deriving the cumulative heat value as an example among the aforementioned methods.

The method of deriving the cumulative heat value according to the present invention is a method of deriving the cumulative heat value, including a momentary heat value derivation of multiplying voltage and current values of the stack of the fuel cell and deriving a momentary heat value, and a cumulative heat value derivation of integrating the derived momentary heat value from a time at which the temperature starts to increase based on the change in time and deriving the cumulative heat value.

The voltage and the current of the stack may be multiplied to derive the momentary heat value. Additionally, the voltage of the stack of the present step indicates a difference between the rated voltage and a practical voltage value of the temperature increasing process, and a unit is [V]. The current of the stack indicates a value of the current flowing through the stack as an original meaning of the term, and a unit is [A]. Therefore, the momentary heat value may be regarded as a momentary output of the stack of the fuel cell in that the momentary heat value is a product of the voltage and the current.

The momentary heat value may be integrated based on the change in time while the temperature increase lasts to derive the cumulative heat value using the momentary heat value. An equation used to derive the cumulative heat value is simply represented below.

$$\text{Cumulative heat value} = \int_{T1}^{T2}(V2-V1) \times Idt$$

wherein T1: temperature increase starting time, T2: current time, V2: theoretical voltage, V1: practical voltage, I: stack current In particular, T1 is the temperature increase starting time and corresponds to a time at which the fuel cell is started. The cumulative heat value indicates the total value of the heat values from the time at which the temperature of the stack of the fuel cell starts to increase, and thus an initial value of an integrating variable may be the temperature increase starting time. T2 indicates the current time, and a time at which the cumulative heat value is measured. Therefore, the cumulative heat value after the temperature of the fuel cell starts to increase may be calculated using the present equation shown above.

As shown in FIG. 1, after the temperature increasing process S300, the method may include limiting, by the controller of the vehicle, a vehicle output to a predetermined output limit value (S400), changing, by the controller of the vehicle, the output limit value as the cumulative heat value of the stack of the fuel cell is increased (S430), and driving or operating a coolant pump of the stack of the fuel cell when the increased cumulative heat value of the stack of the fuel cell is a predetermined reference cumulative heat value or greater (S500).

Even though the temperature is increased during the temperature increasing process S300 by the derived required heat value, the internal temperature of the stack may not be considered to be increased, and the output of the fuel cell may not be regarded as an output in a normal state. Therefore, the output of the fuel cell needs to be appropriately limited to prevent the fuel cell from being degraded and a driver from feeling the sense of unfamiliarity in driving performance.

Accordingly, the present invention includes the output limiting process S400 and the output limit changing process S430. The output limiting process S400 may include limiting the vehicle output at a time at which the start is finished in a cold condition, and the output limit changing process S430 may include changing the limit of the output of the fuel cell based on a change in time since the output of the fuel cell may be gradually improved toward a normal state mode in a cold driving mode state based on the change in time.

The output limit value may depend on the state of the fuel cell and the vehicle during the output limiting process S400. However, the output limit value is a value of when the cumulative heat value of the fuel cell is about the same as the required heat value, accordingly, the output limit value may be closely connected with the required heat value. When the required heat value is substantial, the output limit value may also be large since a sufficient preheating time is provided before the start of the fuel cell. On the contrary, when the required heat value is set to be low and thus rapidly start the fuel cell, the output limit value may be set to be low.

After the start is finished, the stack of the fuel cell may be continuously operated to continuously increase the temperature of the stack of the fuel cell due to heat generated while the fuel cell is operated. Therefore, the output limit value may be changed based on a change in temperature. The output may be limited even though the high output may be sufficiently obtained due to a temperature increase of the stack since the temperature increase may reduce efficiency of the fuel cell. Therefore, the present invention proposes a method of changing the limit of the output using the output limit changing process S430. The method of limiting the output in a cold driving mode state is already extensively known in the art, but in the known techniques, the output is generally limited using the temperature of the coolant of the stack, and there is no precedent for the use of the cumulative heat value as proposed by the present invention. When the cumulative heat value is used as described above, driving of the coolant pump of the stack of the fuel cell may be maximally delayed to improve performance of the fuel cell at low temperatures.

The present invention proposes various methods as the method of changing limiting of the output. Among the methods, includes gradually increasing the output limit value as the cumulative heat value of the stack of the fuel cell is increased. As described above, the operation reliability of the stack of the fuel cell may be gradually increased as the cumulative heat value is increased, thus obtaining the high output. Therefore, the output limit value may be increased as the cumulative heat value is increased in terms of efficiency of the fuel cell.

When the cumulative heat value is about the same as the required heat value, the output limit value may have various values as described above. However, generally, when the cumulative heat value is exactly the same as the required heat value, the output value of the stack of the fuel cell may not be set to the output limit value since there is a discrepancy between ideals and realities. Therefore, the output limit value may be set to a value having a predetermined margin with respect to an ideal output limit value derived using various methods. Therefore, the present invention provides a method of changing the output limit value in the controller of the vehicle when the increased cumulative heat value of the stack of the fuel cell is greater than a predetermined minimum cumulative heat value, assuming that the output limit value has the aforementioned margin value, as the method of changing the output limit value.

Before the cumulative heat value reaches the minimum cumulative heat value, the output limit value may be compensated using a margin of an initial output limit value (e.g., output limit value when the cumulative heat value is about the same as the required heat value), accordingly, the output limit value may not be changed. However, when the cumulative heat value is greater than the minimum cumulative heat value, the output that is greater than the minimum cumulative heat value may be obtained using the margin of the initial output limit value, accordingly, the output limit value may be changed. For the changing method, the output limit value may be gradually increased as the cumulative heat value of the stack of the fuel cell is increased like the aforementioned method.

In the present invention, the minimum cumulative heat value may be less than the reference cumulative heat value as a determination criterion when the coolant pump is driven, and may depend on the output limit value set when the cumulative heat value is about the same as the required heat value. In other words, the minimum cumulative heat value may be substantially large when the output limit value is set with a substantially large margin value, and the minimum cumulative heat value may not be significantly different from the required heat value when the margin value is set to be minimal.

The limit of the output may be changed using the aforementioned methods, and the coolant pump may be driven when the cumulative heat value is the reference cumulative heat value or greater. The stack of the fuel cell may overheat when the cumulative heat value is the reference cumulative heat value or greater. In particular, the coolant pump may be operated to circulate the coolant, thus preventing the stack from overheating. Therefore, the reference cumulative heat value may be derived using the internal temperature value of the stack of the fuel cell at which the fuel cell has normal performance even though the coolant is not circulated. When the fuel cell has reliable performance even at high temperatures, the reference cumulative heat value may be set to be high.

After the coolant pump is driven, the controller may be configured to complete the limiting of the vehicle output based on the cumulative heat value. After the coolant pump is driven, the output of the vehicle may be limited using output limiting based on the coolant temperature of the related art, accordingly, a limiting logic of the output of the vehicle according to the cumulative heat value may be finished. Therefore, when the cumulative heat value is about the same as the reference cumulative heat value, the output limit value may correspond to the initial output limit value in output limiting based on the coolant temperature.

A system for controlling a start of a fuel cell according to the present invention may include a temperature sensing unit 200 (e.g., a sensor) configured to derive or measure an internal temperature of a stack of the fuel cell, a temperature comparison unit 300 configured to compare the derived internal temperature of the stack of the fuel cell to a predetermined reference temperature value, and a controller 100 configured to derive a required heat value using the internal temperature of the stack when the internal temperature of the stack of the fuel cell is less than the reference temperature value, and increase a temperature of the stack of the fuel cell until a cumulative heat value caused by a temperature increase is about the same as the derived required heat value. The various units as described above may be operated by the controller 100.

The temperature of the fuel cell may be appropriately increased and the output may be limited by the present system even when the coolant of the fuel cell is not circulated. Therefore, an inflow of the coolant below zero temperatures into the stack may be maximally delayed, whereby the driving performance of the fuel cell at low temperatures may be improved. In other words, without using the temperature sensor for the coolant of the fuel cell, the controller 100 may be configured to derive the heat value of the fuel cell and use the heat value as a determination criterion for operating the fuel cell, thus improving efficiency and durability of the fuel cell at low temperatures.

According to the present invention, the following effects may be obtained.

First, it may be possible to maximally delay an inflow of a coolant below zero temperatures into a stack and thus improve low temperature driving performance of a fuel cell vehicle.

Second, a point of time at which a coolant pump is operated may be adjusted using a cumulative heat value of the stack of a fuel cell, whereby the stack may be prevented from overheating.

Third, it may be possible to control a cold start driving mode and relieve output limit only using the cumulative heat value not based on a temperature sensor of the stack.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling a start of a fuel cell, comprising:
 comparing, by a controller, an internal temperature of a stack derived by a temperature sensing unit and a predetermined reference temperature value and determining whether the internal temperature of the stack is less than the reference temperature value when an ON signal of the start of the fuel cell is received;

deriving, by the controller, a required heat value for temperature increase using the derived internal temperature of the stack when the derived internal temperature of the stack is less than the reference temperature value;

deriving, by the controller, a momentary heat value by multiplying voltage and current values of the stack of the fuel cell;

deriving, by the controller, a cumulative heat value by integrating, based on a change in time, the derived momentary heat value from a time at which the temperature starts to increase such that a cold start driving mode of the fuel cell vehicle is controlled using the cumulative heat value of the fuel cell without using a temperature sensor of the stack of the fuel cell;

calculating, by the controller, the cumulative heat value using a following equation after the required heat value deriving operation:

$$\text{cumulative heat value} = \int_{T1}^{T2}(V2-V1) \times I \, dt$$

wherein T1: temperature increase starting time at which the fuel cell is started-up, T2: current time at which the cumulative heat value is measured, V2: theoretical voltage, V1: practical voltage, I: stack current; and increasing, by the controller, a temperature of the stack of the fuel cell until the cumulative heat value caused by a temperature increase of the stack of the fuel cell is equal to the derived required heat value.

2. The method according to claim 1, wherein in the required heat value derivation, the internal temperature of the stack is derived by compensating for a temperature of a coolant of the stack of the fuel cell calculated using the temperature sensing unit, based on a start off state maintaining time of the fuel cell.

3. The method according to claim 1, further comprising after the temperature increasing operation:
limiting, by the controller, a vehicle output to a predetermined output limit value;
changing, by the controller, the output limit value as the cumulative heat value of the stack of the fuel cell is increased; and
driving, by the controller, a coolant pump of the stack of the fuel cell when the increased cumulative heat value of the stack of the fuel cell is a predetermined reference cumulative heat value or greater.

4. The method according to claim 3, wherein the output limit value is gradually increased as the cumulative heat value of the stack of the fuel cell is increased.

5. The method according to claim 3, further comprising changing, by the controller, the output limit value when the increased cumulative heat value of the stack of the fuel cell is greater than a predetermined minimum cumulative heat value.

6. The method according to claim 5, wherein the minimum cumulative heat value is less than a reference cumulative heat value.

7. The method according to claim 5, wherein the output limit value is changed to be gradually increased as the cumulative heat value of the stack of the fuel cell is increased.

8. The method according to claim 1, further comprising:
finishing, by the controller, limiting of a vehicle output according to the cumulative heat value after a coolant pump driving operation.

* * * * *